United States Patent [19]

Bowden

[11] Patent Number: 4,739,967
[45] Date of Patent: Apr. 26, 1988

[54] MECHANICAL DETENT

[75] Inventor: Charles J. Bowden, Battle Creek, Mich.

[73] Assignee: Hydreco, Incorporated, Atlanta, Ga.

[21] Appl. No.: 865,384

[22] Filed: May 21, 1986

[51] Int. Cl.$^4$ .............................................. F16K 31/00
[52] U.S. Cl. ..................................... 251/297; 74/531; 411/517
[58] Field of Search ........................ 251/297; 74/531; 403/326; 411/517; 267/158, 164

[56] References Cited

U.S. PATENT DOCUMENTS

| | | | |
|---|---|---|---|
| 2,963,920 | 12/1960 | Hinsey | 74/531 |
| 3,476,148 | 11/1969 | McMillen | 251/297 X |
| 3,899,003 | 8/1975 | Tirelli | 251/297 X |
| 3,986,701 | 10/1976 | Hopkins | 251/297 |
| 4,040,675 | 8/1977 | Richmond et al. | 303/89 |
| 4,185,661 | 1/1980 | Gill et al. | 251/297 |
| 4,260,132 | 4/1981 | Habiger | 251/297 |
| 4,413,805 | 11/1983 | Green et al. | 251/297 |
| 4,491,285 | 1/1985 | Councilman | 411/517 X |
| 4,575,048 | 3/1986 | Bregman et al. | 251/306 X |

FOREIGN PATENT DOCUMENTS 1135349  4/1957  France ............................ 251/317

*Primary Examiner*—A. Michael Chambers
*Assistant Examiner*—John Fox
*Attorney, Agent, or Firm*—Barnes & Thornburg

[57] ABSTRACT

A mechanical detent for engaging a valve spool having a linear element wire spring positioned transverse to the valve spool for engaging circumferential grooves in the spool. The linear element spring includes a single wire spring having a triangular or square shape, or alternatively, one or more non-integral straight wire springs. Extensions of the linear element spring extend a distance away from the spool that is greater than the spring wire diameter. The extensions allow the spring to be movable out of the groove, while still permitting a small diameter spring wire.

10 Claims, 4 Drawing Sheets

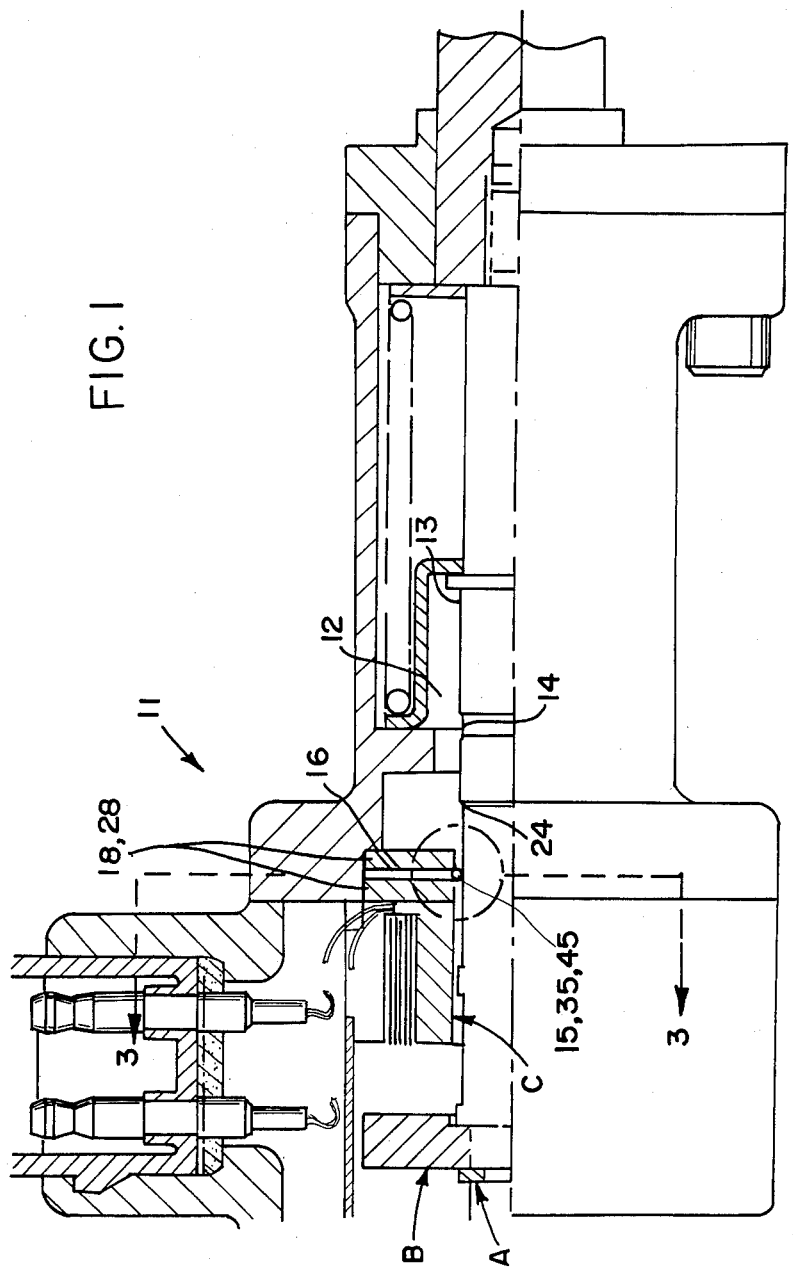

MECHANICAL DETENT

BACKGROUND AND SUMMARY OF THE INVENTION

The present invention relates to a mechanical detent for holding a valve spool in a predetermined position along its longitudinal axis.

One application of a detent is to hold a spool that is spring-centered, i.e., the spool returns automatically to a neutral position when the detent is disengaged. Another application of a detent is to hold a spool that is not spring-centered, i.e, the spool is manually moved to all positions including neutral. In addition to physically holding the spool in a certain position ("stop" position), a mechanical detent may also be used for a "feel" position. To move the spool past a feel position requires the operator to exert a higher force, indicating that a particular stage of the spool stroke has been reached or passed through. However, the spool is not physically held in this position.

Maintaining a valve spool in a predetermined position by means of a mechanical detent has been attempted in many forms. Various forms of the detent include spring-loaded radial detents and C-shaped spring detents which surround the circumference of the valve spool. All of the above detents engage a groove or a step on the periphery of the valve spool.

The spring-loaded radial detents engage a groove on the spool stem, producing a radial force at a single point of contact. Some problems with the spring-loaded radial detents are that they require a number of parts, take up a large amount of space in the housing of the valve spool, and are costly both in part costs and assembly time. For example, in the case of a ball-type radial detent, the ball construction must display a radius approximately two or more times greater than the depth of the groove in order to provide a means for effectively moving the ball out of the groove. Thus, the deeper the groove is made, the larger the ball size must be. In trying to keep the ball size within an acceptable size range, while maintaining an acceptable groove depth, this required ratio between the ball and the groove results in a relatively shallow groove and a relatively large ball.

Due to the built-in requirement of this relatively shallow groove, this construction creates the need for heavy loading of balls by spring(s) in order to maintain the ball in the groove. Additionally, where the ball size must be at least two times the groove depth, the only way to minimize the overall size of the valve structure is to have close toleranced housing valve spool and engaging parts. Such close toleranced parts increase the overall cost of the valve structure.

In the case of a C-shaped spring detent, the C-shaped spring surrounds the circumference of the valve spool and radially extends around the grooveless surface of the valve spool. When the groove of the valve spool is moved past the C-shaped spring, it springs radially inward, engaging the groove. The C-shaped spring provides essentially continuous contact around the surface of the spool. As in the case of the ball design, the C-shaped spring must have a relatively large cross-sectional diameter with respect to the groove depth since it must extend well beyond the surface of the spool to be effectively moved out of the groove. This required dimension of the groove engaging element creates the need for a relatively shallow groove to keep the C-ring size in an acceptable range and a corresponding heavy loading to maintain the element in the groove.

In addition to the constraint of requiring a relatively large groove engaging element, a relatively shallow groove, and a corresponding heavy load, the structure of the C-shaped spring and the ball-type detent also requires large spring size in order to have as low a rated spring (load/deflection) as possible. A low rated spring is necessary in order to have a maximum groove depth. Having a groove that is as deep as possible is desireable for manufacturing and tolerancing purposes. A low rated spring is necessary in the case of a maximum groove depth in order to move the element out of the groove. Without a low rated spring, a large load is required to move the element out of the groove. However, due to the construction of the above-mentioned detents it is necessary to further increase the overall size of the spring to achieve a low rated spring.

For example, to have a low rate C-shaped spring, the overall diameter D of the spring (the full length of the "C") must be large with respect to the diameter d of the wire of the spring, further increasing the size of the structure. The rate of the C-shaped spring is related to the ratio d/D. The lower this ratio, the lower the spring rate. Since the diameter d of the wire must be at least two times the groove depth, the numerator of this rate, d, has a somewhat "fixed" minimum value. Thus, to have a lower spring rate, the denominator, D, the overall size of the spring, must be large. Where a spool size is predetermined, modification of the spool may be necessary in order to accomodate a large, low rate spring.

In the case of the ball-type detent, having a coil spring having a wire size d and an overall spring length D, the spring rate is also related to the ratio d/D. To obtain a low spring rate, the length of the spring, D, must be large, making the overall size of the spring very large. The length of the spring especially affects the size of the total valve structure due to its orientation. In the ball-type detent, the coil spring is positioned radially outward from the ball. Thus, each increase in spring length further extends the radial distance between the spool and the housing required to accomodate the ball and spring. Although the surrounding parts can be constructed to be close-fitting to minimize the size, this is an expensive process.

Another disadvantage of the spring-loaded radial detents and the C-shaped spring detents is that, since the radius of the groove engaging element must be substantially greater than the depth of the groove, an enlarged load angle results. The load angle is defined as the angle between a horizontal axis through the groove engaging element and the axis traveling through the point of contact of the engaging element against the side wall of the groove and the center of the element. The load angle is equal to the angle of the side wall of the groove, or the groove angle. Due to the large load required in these types of detents, as well as the correspondingly high loading rates involved, these systems usually employ an edge contact point, whereby the outer diameter edge of the spool stem at the point where the groove begins contacts the wire or ball. This construction provides poor load angle control and high point contact stresses.

Examples of the spring-loaded radial detents are found in U.S. Pat. Nos. 3,986,701 to Hopkins, 4,040,675 to Richmond et al. and 4,260,132 to Habiger. Examples of the C-shaped detent are shown in U.S. Pat. Nos. 4,413,805 to Green et al. and 4,185,661 to Gill et al.

It is an objective of the invention to create a detent having a groove engaging element having a radius which is independent of the groove size; the radius may be larger than, equal to or smaller than the depth of the groove.

It is another objective of this invention to create a detent having a groove engaging element which provides improved "feel" and "stop" characteristics with a reduced diameter.

It is another objective of the invention to create a detent which does not require a large number of parts and which requires reduced space in the valve spool assembly.

Another objective of this invention is to create a detent having improved load angle control and reduced contact stresses.

Another objective of this invention is to create a detent which provides improved "feel" and "stop" characteristics upon engagement and disengagement of the groove.

Another objective of the invention is to create a detent such that the clearance between the spool and the engaging elements is not as critical.

Another objective of the invention is to be able to place a detent anywhere on the spool and to avoid having to modify the spool to accomodate a low rate spring.

It is a further objective of the invention to create a detent which is easy to assemble and disassemble.

These objectives are achieved by a detent having a linear element spring having extensions which extend a sufficient distance beyond the surface of a spool to be engageable with the engaging element which moves the spring out of circumferential grooves on, the spool. Thus, the wire diameter of the spring is not critical, and may, for example, be reduced since the groove engaging portion of the wire is not the primary contact surface used to force the spring out of the groove.

The spring may be formed from a single wire having three or more linear segments interconnected at elbows. Alternatively, one or more linear springs may be positioned by a retainer. The extensions should extend a distance at least twice the diameter of the spring wire. Since the radius of the spring wire is not dependent on the particular desired groove depth, the radius of the spring wire can be greater than, equal to or less than the depth of the circumferential groove. Additionally, since there is no minimum required value for the spring wire in relation to the groove depth, a low rate spring may be designed without requiring a large spring size. Also, since the spring wire need not be at least two times the size of the groove depth, the point of contact between the groove engaging element and the side wall of the groove is below the edge point where the groove meets the outer diameter of the spool.

Further objects, features, and advantages of the present invention will become more apparent from the following description when considered in conjunction with the accompanying drawings which show, for purposes of illustration only, embodiments in accordance with the present invention.

BRIEF DESCRIPTION OF THE DRAWINGS

FIG. 1 is a side partial cross-sectional view of a valve spool with a detent mechanism incorporating the principles of the present invention.

DETAILED DESCRIPTION OF THE DRAWINGS

Figure 4:
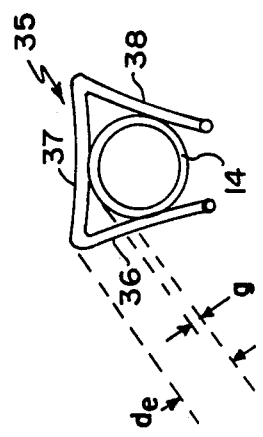
FIG. 4 is a view similar to FIG. 3 showing the detent mechanism disengaged from the groove.

As shown in FIG. 1, the detent mechanism is contemplated for use in a valve assembly. The valve assembly is comprised of a valve housing 11 having an internal cylindrical bore 12. A valve spool with spool stem 13 is positioned and is movable within the bore 12 along the longitudinal axis of the spool stem 13. The spool 13 may be moved manually or otherwise in either one direction or both directions within the bore 12 to define a plurality of operational positions of the spool. While a three position valve usually includes forward, reverse and neutral positions, a four position valve may additionally include a float position. Forward and reverse are only relative and in some applications represent raise and lower. These are just examples. The spool stem 13 has at least one circumferential groove 14 and/or step or ramp 24 spaced along its length. Depending on whether the contour of the spool is grooved or stepped, a position along the stem 13 will represent either a "stop" position (14) or a "feel" position (24), respectively.

Figure 3:
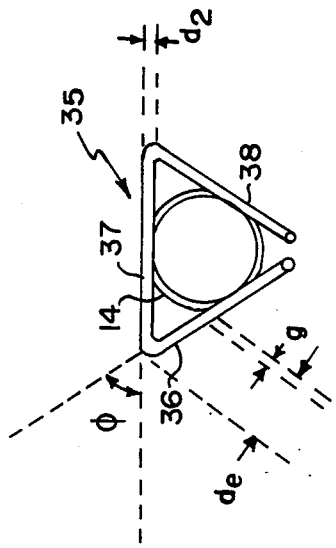
FIG. 3 is a cross-sectional view of the detent mechanism taken along Line 3—3 shown in FIG. 1 showing a spring according to a preferred embodiment of the invention engaged in a groove.

The detent mechanism in the valve housing is comprised of at least one linear element spring positioned transverse to the axis of motion of the spool stem 13. According to a preferred embodiment of the invention shown in FIGS. 3 and 4, the linear spring 35 has three linear sides or elements 36, 37 and 38 formed from a single wire spring. This triangle-shaped spring, open-ended at one point of the triangle, comprises two linear sides or elements 36 and 38 having one open end and one closed end and one side 37 having two closed ends. Each of the linear sides of the spring is positioned transverse to the surface of the spool stem 13, creating a tangent to the point of contact between the spring elements 36, 37, 38 and the spool stem 13.

Figure 2:
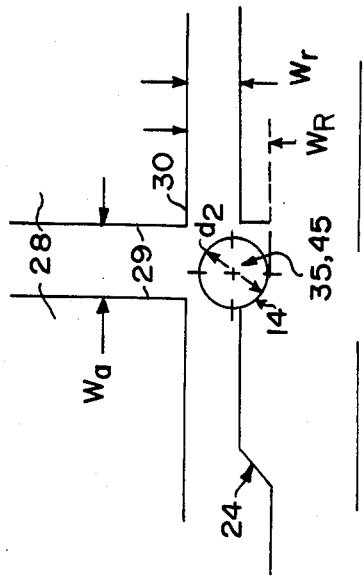
FIG. 2 is an enlarged view of the circular dashed area of FIG. 1.

The triangle-shaped spring is biased against the surface of the spool stem at all times, and thus, holds itself in place. An engaging element 28 is formed as part of the detent housing 18 and maintains the spring in an essentially radial position with respect to the surface of the spool stem 13 during operation. The engaging element 28 is formed as two annular plates around the spool stem 13 as shown in FIGS. 1 and 2. The shoulder 30 of the engaging element defines an axial space having radial width $w_r$ between the engaging element 28 and the non-grooved outer surface of the spool 13. A radial width $w_R$ is defined by the distance between the engaging element 28 and the bottom of the groove 14 in the spool 13. The inner surface 29 of the two engaging plates 28 defines a radial space having an axial width $w_a$ in which the elbow shaped extensions of the triangular shaped spring are maintained. As shown in FIG. 2, the axial width $w_a$ of the radial space is slightly greater than the diameter $d_2$ of the spring to minimize axial movement with respect to the spool. The radial width $w_r$ of the axial space may be greater than, equal to or less than the diameter $d_2$ of the spring since this parameter is not critical and is not dictated by any constraints in the design. The above configuration, shown in FIGS. 2 and 6, minimizes the axial deflection of the spring elements.

In the design of a detent mechanism, certain parameters are generally dictated by the various other pieces involved in the valve spool assembly. Thus, the spool stem diameter is generally dictated by various existing parts to be attached to the spool stem. For example, as shown in FIGS. 1, A, B and C are various Parts which are incorporated in the valve spool assembly. The clearance $w_r$ between the spool and housing is generally chosen to be as small as possible without having to redesign or require special tolerances of the other existing parts. According to an embodiment of the invention, this clearance $w_r$ is approximately 0.015 to 0.020. After these parameters are determined, the remaining parameters to be considered are the wire size and the groove depth which the wire will engage.

A first consideration is that in the case of the triangular-shaped spring, the angles created by the elbow-shaped extensions must be an angle which will provide as equal a load as possible at the three points of contact to ensure that the clip will snap completely into the groove upon engagement. According to an embodiment of the invention, this angle $\theta$ (phi) is 50° to 60°.

Figure 9:
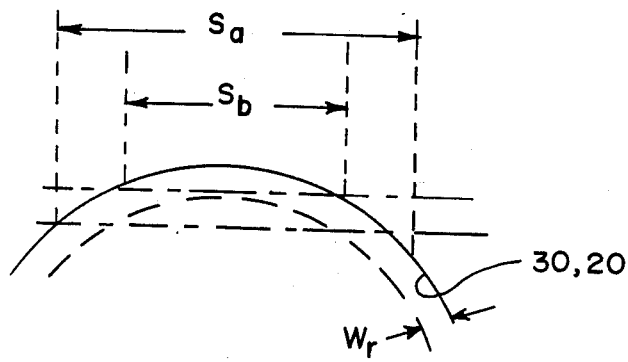
FIG. 9 is a view similar to FIG. 3.

A second consideration is the requisite support length of the spring member which is positioned transverse to the spool. As shown in FIG. 9, the support length is defined as the distance the linear wire element extends from the inner diameter of the retainer. The relationship between the chosen support length S and the wire diameter $d_2$ must be such that there is minimal axial deflection of the linear detent sections as the spool moves. As shown in FIG. 9, practical supports lengths $s_a$ through $s_b$ are determined. Using these practical support lengths $s_a$ through $s_b$, the axial holding load which will be applied to the wire, and considering a minimal axial deflection of the spring wire, a range of possible wire diameters $d_a$ through $d_b$ may be determined. Each of these diameters will provide a different loading rate (load vs. deflection).

A third consideration in choosing the dimensions of the detent is that it is preferable to have as low rated a spring as possible. The spring rate corresponds to the relationship between the diameter of the spring wire vs. spring size (d/D). In the case of the radial and C-ring type detents the wire diameter must be relatively high. Thus, the spring size D, must be relatively large in order to get a low spring rate. In the invention, however, d is not as limited to large sizes. Thus the size of the spring need not be as large in order to obtain a low spring rate. In this way, low spring rates are available in the invention without requiring a large overall package.

The triangle-shaped spring forms elbow-shaped extensions which extend a distance $d_e$ from the surface of the spool. The length $d_e$ of these extensions is at least equal to or greater than diameter $d_2$ of the wire of the triangle-shaped spring. This configuration is advantageous in that a relatively small diameter spring may be used, since engaging element 28 may engage the extensions $d_e$ of the spring to displace the spring as the spool moves, instead of the portion of the spring extending radially out of the groove 14, as is the case with radial-type detents and C-shaped spring detents. The extensions permit the engaging element 28 to easily move the spring out of the groove. Thus, a relatively small diameter spring can be used which sits deeply into the groove. This configuration results in the detent having good "feel" characteristics since the smaller spring having extensions will travel a greater radial distance in and out of the groove, and thus, more positively engage and disengage the groove.

Additionally, the compact detent may be used at portions of the valve assembly having a very small diameter. Since the extension extends beyond the spool 13 and engages the engaging element 28 outside the axial space, the radial width $w_r$ of the axial space is less critical and may be designed to be greater than, equal to or less than the diameter $d_2$ of the wire. Similarly, the radius r of the wire may be greater than, equal to or less than the depth g of the groove 14. A particular figure is not dictated by any other constraints of the design.

The prior art, specifically the C-ring and the ball-type detents, do not have the same advantageous characteristic. For example, a C-ring and a ball type detent must be engaged at a point below their central plane to be moved out of the groove effectively. Thus, they must be designed to have a radius at least two times the depth of the groove, to provide a means for being lifted out of the groove. Such a construction requires a relatively shallow groove with respect to the size of the C-ring or ball. As a result of this arrangement, the C-ring and ball do not sit as deeply in the groove and therefore do not provide an effective "feel" characteristic. If a deeper groove is desired, the size of the C-ring or ball must be increased to maintain its ability to disengage. Additionally, a lower spring rate will be required as the groove becomes deeper, corresponding to an even larger size of the C-ring or coil spring used with the ball type detent.

As indicated in FIG. 4, the spring exhibits "bowing" characteristics as it moves out of the step or groove. The open-ended sides 36 and 38 deflect outwardly and upwardly to accomodate the larger diameter of the spool as the spring moves out of the step or groove 14. This flexibility, due to the open-end at one point of the triangle-shaped spring, results in improved rate control characteristics of the detent mechanism (controlling the load with respect to deflection of the spring). The flexibility of the triangle-shaped spring allows the use of a less expensive, smaller diameter wire. Also, the groove can have a deeper design resulting in a better "feel" characteristic.

The C-ring, on the other hand, does not have as effective a "feel" characteristic. Since it does not deflect as easily, requiring a large load per deflection, it is designed for use with relatively shallow grooves. A deeper groove with a corresponding better "feel" characteristic is inefficient to design since an even larger load would be required to move the C-ring out of the groove. Since the groove must be relatively shallow, the load that the C-ring must exert to remain in the groove is relatively large.

Figure 5:
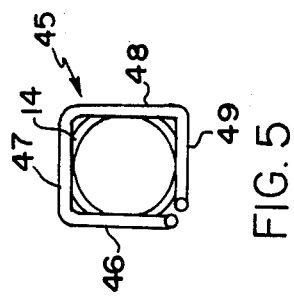
FIG. 5 is a cross-sectional view of the detent mechanism showing another preferred embodiment of the invention.

According to another embodiment of the invention, shown in FIG. 5, the linear spring has four linear sides or elements 46, 47, 48 and 49 and is formed from a single wire. This rectangular-shaped spring, open-ended at one point of the rectangle, comprises two linear elements 46 and 49 having an open end and a closed end and two linear elements 47 and 48 having two closed ends. As in the three element spring, the elements are positioned transverse to the spool 13 and are prevented from axially deflecting by means of an engaging element 28 as shown in FIG. 2. As in the triangular-shaped embodiment, advantageous features exist with respect to the elbow-shaped extensions and the compactness of the design.

Figure 6:
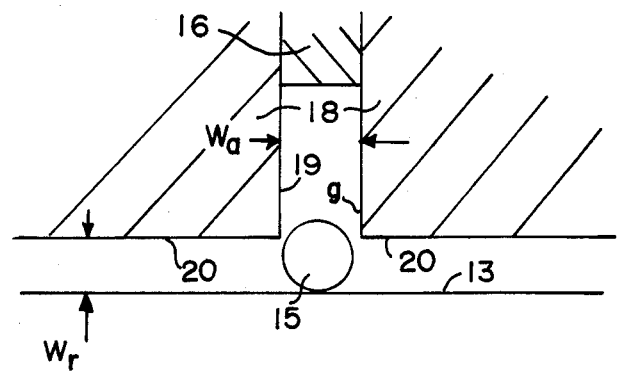
FIG. 6 is a view similar to FIG. 2, showing a different embodiment.
Figure 7:
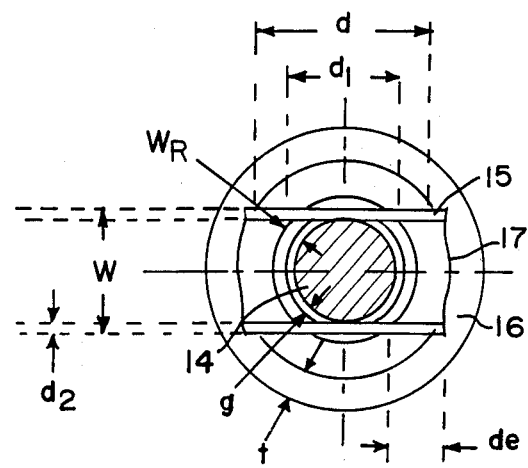
FIG. 7 is a view similar to FIG. 3, showing a different embodiment.

According to other embodiments of the invention, shown in FIGS. 6 and 7, the linear spring is comprised of one (not shown), two (FIG. 7) or three (not shown) straight wire springs 15 positioned transverse to and extending beyond the spool stem 13. The springs are held in place by a retainer 16 which surrounds the spool stem 13. The retainer 16 is an annular plate that is round inside and outside for ease of manufacturing. The inner circumference of the retainer has two key-type through-slots 17 which are 180° apart. The straight wire springs 15 are maintained in position against the surface of the spool by means of the key slots as shown in FIG. 7.

As shown in FIG. 6, the detent mechanism is held in a particular position along the path of travel of the spool stem 13 by the detent housing 18. The detent housing 18 is located adjacent to the retainer 16. The shoulder 20 of the detent housing 18 defines an axial space having radial width $w_r$ between the housing and the spool. The shoulder 19 defines a radial space having an axial width $w_a$ into which the spring can deflect. As shown in FIG. 6, the axial width $w_a$ of the radial space is greater than the diameter $d_2$ of the spring, and the radial width $w_r$ of the axial space may be greater than, equal to or less than the diameter $d_2$ of the spring, so that the spring can deflect radially, with minimum axial movement. The above configuration, shown in FIG. 6, limits axial deflection of the straight wire springs. The length $d_e$ of the extensions should be at least equal to or greater than the diameter d of the wire 15. Also, the radius r of the wire 15 may be equal to, greater than or less than the depth g of the groove 14 since a particular radius is not required for engagement and disengagement purposes.

Additionally, the thin plate retainer 16 has a thickness corresponding to the axial width $w_a$ of the detent housing 18 which is slightly larger than the diameter of the spring wire $d_2$. This configuration prevents the spring wire from being clamped by the retainer housing 18, which would minimize its linear looseness.

As shown in FIG. 7, the distance between the two corresponding key-type slots which retain the springs and the inner diameter of retainer forms the spring support distance d. The slot width w, the spring support distance d, the spool stem diameter $d_1$, the groove depth size g, and the spring wire diameter $d_2$, all determine the required load L to be applied by the spring wire 15.

The following is a description of the operation of the detent for a valve spool constructed in accordance with the above discussed embodiments of the invention. During operation, the linear spring 15; 35; 45 travels along the surface of the spool stem 13 in a direction transverse to the longitudinal axis of the spool stem 13. As the spool stem 13 travels through the bore 12, either manually or otherwise, the spring 15; 35; 45 is biased against the surface of the spool stem 13 in such a way that when the groove 14 on the spool stem 13 passes the spring 15; 35; 45, the spring engages the groove 14.

The spring 15; 35; 45 has extensions $d_e$ which are engageable by a detent housing 18 or engaging element 28 for moving the spring out of the groove. The extension $d_e$ is equal to or greater than the diameter $d_2$ of the spring.

Whether the detent is used for a "feel" position or a "stop" position is determined by the contour of the spool or the stem 13. To use the detent for a "feel" position, the contour of the spool stem 13 is in the form of either a step or a ramp 24 as shown in FIG. 2. In order for the spool stem 13 to continue passing between the spring wires 15; 35; 45, a sufficient force must be exerted so that the step or ramp deflects the spring wires into the radial space shown in FIGS. 2 and 6, which is defined by the engaging element 28 in the embodiments shown in FIGS. 2 through 5, and the detent housing 18 and the retainer plate 16 in embodiments shown in FIGS. 6 through 8. The step height or ramp angle determines the force required to move the stem past the spring wires 15; 35; 45.

Figure 8:
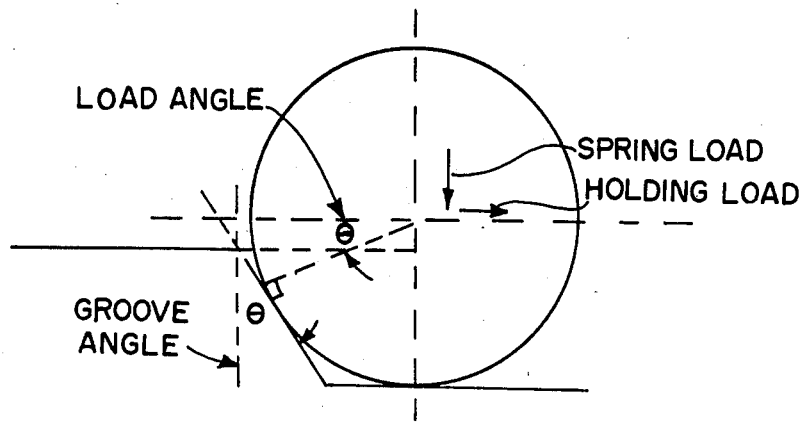
FIG. 8 is a view similar to FIG. 2.

As shown in FIG. 8, the construction of the linear element spring of the invention permits positioning the wire in the groove to contact the side wall of the groove below the edge point of the groove. This orientation creates good control of the load angle $\theta$. According to an embodiment of the invention, this load angle is approximately 17°. Since the edge of the groove is not used as the "pivot point" to move the wire out of the groove, point stresses are reduced.

To use the detent in a "stop" position, the spool stem 13 passes between the linear spring elements 15; 35; 45; in a fully deflected state. When the detent groove 14 passes under the spring wires 15; 35; 45; the wires engage the groove, holding the spool stem 13 in a fixed position when the force moving the spool stem 13 along its longitudinal axis is removed. To move the spool stem 13 out of the detent position, one should force the spool in the desired direction until the side of the groove 14 having depth, g, radially deflects the spring wires enough for the spool stem 13 to pass between them.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A mechanical detent in combination with a valve comprising:
   a valve housing including a bore;
   a spool means movable axially in said bore and having at least one circumferential groove, said circumferential groove having a depth and a predetermined position on said spool means;
   resilient means including at least three joined linear segments each including a width positioned along the depth of the groove and a length forming an extension positioned transverse to the surface of said spool means for engaging said groove and said spool means at least three points sufficiently spaced around a circumference of said spool means to hold the resilient means in place radially on said spool means;
   engaging means including a pair of annular plates secured in housing around said spool means for engaging said extensions only axially to disengage said resilient means from said groove during movement of said spool means; and
   wherein the cross-sectional diameter of said resilient means is less than the radial distance from the bottom of the circumferential groove to said annular plates.

2. A mechanical detent according to claim 1, wherein said resilient means is comprised of a single wire spring formed as a triangle-shaped spring surrounding said spool means.

3. A mechanical detent according to claim 2, wherein said triangle-shaped spring is open-ended at one of the three points of said triangle, forming two sides having one open end and one closed end and one side having two closed ends.

4. A mechanical detent according to claim 2, wherein each of the sides of said triangle-shaped spring are positioned transverse to the axial direction of the spool means.

5. A mechanical detent according to claim 2, wherein each of the sides of said triangle-shaped spring forms a tangent at the point of contact with said spool means.

6. A mechanical detent according to claim 3, wherein each side of said triangle-shaped spring has a width and a length, said width being positioned along the depth of the groove and the length being positioned transverse to the surface of the spool means, said lengths forming elbow-shaped extensions extending a distance from the surface of said spool means.

7. A mechanical detent according to claim 3, said triangle-shaped spring forming elbow-shaped extensions extending a tangential distance from the surface of said spool means.

8. A mechanical detent according to claim 1, wherein the cross-sectional radius of said resilient means is less than the depth of the circumferential groove.

9. A mechanical detent according to claim 1, wherein said cross-sectional radius is approximately 0.0275 inches.

10. A mechanical detent according to claim 1, wherein said resilient means has a cross-sectional radius that is larger than the groove depth.

* * * * *